United States Patent [19]
Sackheim et al.

[11] Patent Number: 5,572,865
[45] Date of Patent: Nov. 12, 1996

[54] SATELLITE PROPULSION AND POWER SYSTEM

[75] Inventors: Robert L. Sackheim; Dale L. Hook, both of Rancho Palos Verdes; Gary W. Joseph, Torrance, all of Calif.

[73] Assignee: TRW Inc., Redondo Beach, Calif.

[21] Appl. No.: 299,782

[22] Filed: Sep. 1, 1994

Related U.S. Application Data

[63] Continuation of Ser. No. 748,990, Aug. 21, 1991, Pat. No. 5,417,049, which is a continuation-in-part of Ser. No. 511,153, Apr. 19, 1990, Pat. No. 5,282,357.

[30] Foreign Application Priority Data

Apr. 18, 1991 [GB] United Kingdom ................... 9108327

[51] Int. Cl.⁶ ................................................. F02K 9/68
[52] U.S. Cl. ........................... 60/260; 60/267; 60/39.462
[58] Field of Search ................................ 60/39.462, 257, 60/260, 267

[56] References Cited

U.S. PATENT DOCUMENTS

| | | | |
|---|---|---|---|
| 2,532,708 | 12/1950 | Goddard | 60/39.04 |
| 3,050,936 | 8/1962 | Abild et al. | 60/266 |
| 3,091,520 | 5/1963 | Newburn | 60/260 |
| 3,149,460 | 9/1964 | Rocca | 60/260 |
| 3,170,290 | 2/1965 | Webb | 60/267 |
| 3,358,455 | 12/1967 | Hunt | 60/257 |
| 3,514,953 | 6/1970 | Kephart | 60/258 |
| 3,541,788 | 11/1970 | Schultz | 60/258 |
| 3,597,923 | 8/1971 | Simon | 60/267 |
| 3,699,772 | 10/1972 | Elverum, Jr. | 60/39.74 A |
| 3,861,138 | 1/1975 | Bridgeforth, Jr. et al. | 60/217 |
| 3,882,676 | 5/1975 | Schmidt | 60/260 |
| 3,898,798 | 8/1975 | Williams | 60/207 |
| 3,955,784 | 5/1976 | Salkeld | 60/245 |
| 4,137,286 | 1/1979 | Bornstein | 102/531 |
| 4,206,594 | 6/1980 | Elverum, Jr. | 60/158 |

(List continued on next page.)

FOREIGN PATENT DOCUMENTS

| | | | |
|---|---|---|---|
| 1089055 | 1/1967 | United Kingdom | 60/267 |
| 1439368 | 6/1976 | United Kingdom | 60/260 |
| 2226999 | 7/1990 | United Kingdom . | |
| WO870787 | 12/1987 | WIPO . | |

OTHER PUBLICATIONS

S. C. Knowles & S. E. Yano, "Design, Testing and Interaction of a Flight–Ready Hydrazine Arcjet System", AIAA/ASME/ASEE 25th Joint Prop. Conf. Jul. 10–12, 1989, AIAA–89–2720.

C. L. Dailey & R. H. Lovberg, "Pulsed Inductive Thruster Component Technology," Final Report to Air Force Astronautics Laboratory, published Apr. 1987 by Nat'l. Technical Inf. Service, AFAL TR–87–012.

Dodge, Riebling & Nunz, "Experimental Evolution of an Earth–Storable Bimodal Rocket Engine", AIAA/SAE 8th Joint Propulsion Specialist Conference, Nov. 29–Dec. 1, 1972.

Primary Examiner—Louis J. Casaregola

[57] ABSTRACT

In the preferred embodiment of the invention, a cooled bipropellant thruster 70 for controlling the on-orbit position and orientation of a spacecraft is provided. The cooled bipropellant thruster 70 uses a liquid fuel and liquid oxidizer. The liquid fuel is decomposed in a first chamber 72 with a catalytic bed of decomposition material 74 and produces at least one reaction gas, which flows to the second reaction chamber 90. The second reaction chamber 90 is heated by the reaction gas, but is cooled by liquid oxidizer flowing through cooling passages 92, 94, 98, and 102, which brings the oxidizer into a heat exchange relationship with the second reaction chamber 90. During the heat exchange relationship, heat is transferred from the second reaction chamber 90 to the oxidizer and the oxidizer transforms into a gas. The gaseous oxidizer is fed into a second reaction chamber 90 to secondarily react with the reaction gas.

13 Claims, 7 Drawing Sheets

U.S. PATENT DOCUMENTS

| | | | |
|---|---|---|---|
| 4,223,606 | 9/1980 | Bornstein | 102/374 |
| 4,305,247 | 12/1981 | Ellion et al. | 60/200 R |
| 4,322,946 | 4/1982 | Murch et al. | 60/203.1 |
| 4,583,362 | 4/1986 | Wagner | 60/267 |
| 4,609,169 | 9/1986 | Schweickert et al. | 244/172 |
| 4,722,183 | 2/1988 | Rosen | 60/259 |
| 4,723,736 | 2/1988 | Rider | 60/259 |
| 4,741,502 | 5/1988 | Rosen | 244/172 |
| 4,787,579 | 11/1988 | Smith | 244/169 |
| 4,802,333 | 2/1989 | Smith | 60/200.1 |
| 4,805,399 | 2/1989 | McKevitt | 60/258 |
| 4,825,819 | 5/1989 | Morash | 60/740 |
| 4,841,723 | 6/1989 | Lau et al. | 60/267 |
| 4,898,000 | 2/1990 | Weigand et al. | |

SATELLITE PROPULSION AND POWER SYSTEM

CROSS REFERENCE TO A RELATED APPLICATION

This is a continuation of U.S. patent application Ser. No. 07/748,990, filed Aug. 21, 1991, now U.S. Pat. No. 5,417,049 issued May 23, 1995, which is a continuation-in-part of Ser. No. 07/511,153 filed Apr. 19, 1990, now U.S. Pat. No. 5,282,357 issued Feb. 1, 1994.

BACKGROUND OF THE INVENTION

This invention relates generally to rocket propulsion systems and more particularly, to rocket propulsion systems for placing and maintaining spacecraft in planetary orbits. Although the invention has broad application to unmanned spacecraft, it is particularly concerned with launching and maintaining satellites in geosynchronous orbits. Placing a geosynchronous satellite into orbit typically involves three principal mission phases. First, the satellite is placed in the low earth orbit not far above the earth's atmosphere, either as a part of payload of the space shuttle vehicle or on a conventional non-reusable rocket vehicle. In the second phase, the satellite orbit has its apogee or highest point raised in altitude by one or more rocket "burns" at a select point in orbit, until the apogee is approximately at geosynchronous altitude. Finally, the satellite is given an apogee "kick," i.e. a further rocket burn at apogee that circularizes the orbit at geosynchronous altitude.

Once in orbit, rocket engines will be called on for two further functions: station keeping and attitude control, which are sometimes referred to collectively as reaction control systems (RCS) functions. Satellites are usually required to maintain a particular "station" with respect to the earth's surface. Maintaining this station requires the expenditure of energy, even though the orbit is theoretically self-sustaining and geosynchronous. Various factors, such as the non-spherical nature of the earth, gravitational influences of the moon and sun, and so forth, require that the orbit be corrected from time to time if the required station is to be maintained. Attitude control is simply the use of multiple rocket engines on the spacecraft to maintain a particular angular attitude of the vehicle. This may be needed, for example, to point an antenna or other sensor at the earth, the sun, or a star.

Rocket engines associated with orbiting spacecraft may be called upon to perform the various functions of orbital transfer, station keeping and attitude control. Unfortunately, the performance characteristics required for these functions are not identical. A figure of merit often used in comparison of rocket engines is the specific impulse, $I_{sp}$, which is defined as the thrust developed by an engine per unit of propellant weight flow rate. If the thrust is measured in pounds and the flow rate in pounds per second, then the units of measurement of specific impulse are seconds. The specific impulse is analogous to miles-per-gallon figure for an automobile, since it measures how much thrust is developed for a unit fuel flow rate.

Another measure of performance is, of course, the thrust force generated by the engine. For the rapid acceleration as required in transition to geosynchronous orbit, particularly at the apogee "kick" phase of the mission, an engine with a relatively large thrust is required, perhaps generating up to several thousand pounds of thrust force. The specific impulse is also important, and should be in the 300–400 second range. For station keeping and attitude control, high thrust is not quite so important, since most station keeping and attitude control maneuvers can be accomplished with low thrust burns of the rocket engines. However, fuel economy and engine durability is very important for the rocket engines used in these activities. Rockets of this type are used repeatedly over a mission that may last as many as ten years and therefore engine durability is important. Cooling the small engines used for RCS functions is difficult due to their small thermal radiating surfaces. Thus, any prolonged use may melt the thrust chamber. However, durability can be improved by using special materials such as COLUMBIUM, which can withstand the 4000° F.–5000° F. temperatures generated in the combustion chamber.

In the past, the approach followed to launch a satellite has typically involved using multiple fuels and engine systems for two tasks. For example, a solid rocket is used for the apogee kick engine and hydrazine catalytic engines for the station keeping and attitude control system thrusters. There is nothing inherently wrong with this traditional approach, except that the use of two separate propulsion systems severely limits the size and the useful payload that can be placed and maintained in orbit.

Some improvement can be attained using an integrated bipropellant system, in which both the apogee "kick" engine and the RCS thrusters use a bipropellant fuel system, such as monomethyl hydrazine (MMH) as a fuel and nitrogen tetroxide ($N_2O_4$) as an oxidizer. However, there is still room for further improvement in the payload that can be placed in orbit for a given mission. Another way to look at the problem is that there is room for improvement in the lifetime that a given spacecraft payload may be maintained in orbit. With a more efficient propulsion system, a greater payload may be maintained in orbit for a given time, or the same payload may be maintained in orbit for a longer time.

The present invention in one embodiment provides for a more efficient propulsion system suitable for geosynchronous and other high energy mission spacecraft programs. The preferred embodiment relates to a cooled bipropellant thruster for controlling the on-orbit position and orientation of a spacecraft.

SUMMARY OF THE INVENTION

The present invention in one embodiment resides in a propulsion system employing the same fuel in both a monopropellant or a bipropellant mode for high thrust orbital transitions, and in a monopropellant and a bipropellant mode for station-keeping and attitude control, to reduce propellant weight requirements and increase the payload that can be delivered to and maintained in a desired orbit. Briefly, and in general terms, the propulsion system of the invention comprises a liquid fuel bipropellant high-thrust engine, a liquid fuel tank and an oxidizer tank connected to the high thrust engine, and a plurality of cooled bipropellant thrusters operating in a monopropellant or a bipropellant mode for station-keeping and attitude control. The cooled bipropellant thrusters are connected to the same liquid fuel tank and use the same fuel as the high-thrust engine, to provide a substantial saving in propellant weight and propulsion system inert weight for giving mission requirements. Therefore, a higher effective payload may be placed and maintained in a desired orbit for a greater time than if a more conventional propulsion systems are used.

More specifically, the liquid fuel used in the propulsion system of the invention is pure hydrazine. The oxidizer may be nitrogen tetroxide ($N_2O_4$), liquid oxygen, nitrogen trifluoride (NF$_3$), nitrogen tetrafluoride (N$_2$F$_4$), or combinations of these substances. Optionally, the RCS thrusters may include at least one cooled bipropellant thruster for controlling the on-orbit position and orientation of a spacecraft. The cooled bipropellant thruster of the preferred embodiment utilizes hydrazine fuel and an oxidizer. The hydrazine fuel is decomposed in a first chamber within a catalytic bed of decomposition material and produces at least one reaction gas, which flows to the second reaction chamber. The second reaction chamber is heated by the reaction gas, but is cooled by liquid oxidizer in a heat exchange relationship with the second reaction chamber. The heat exchange relationship transfers heat from the second reaction chamber to the oxidizer and the oxidizer absorbs the heat and is transformed into a gas. The gaseous oxidizer is fed into the second reaction chamber to secondarily react with the reaction gases.

The method of operating the high-thrust engine and cooled bipropellant thruster preferably includes means for reducing unwanted combustion of fuel after shutdown in the fuel line upstream of the combustion chamber. One option is to purge the fuel line, with an inert gas. Another is to open the fuel valve proceeding the opening of the oxidizer valve and to close the oxidizer valve proceeding the closure of the fuel valve to ensure that all the oxidizer has reacted.

It will be appreciated from the foregoing that the present invention represents a significant advance in the field of rocket propulsion systems. In particular, because the system of the invention uses the same liquid fuel, hydrazine, for both bipropellant and monopropellant propulsion modes, there is a resultant saving in propellant weight and the inert propulsion system weight for any given mission, and more payload can be placed and maintained in a desired orbit. Other aspects and advantages of this invention will become apparent from the following more detailed description, taken in conjunction with the accompanying drawings.

DETAILED DESCRIPTION OF THE INVENTION

As shown in the drawings for purposes of illustration, one embodiment of the present invention is concerned with a novel propulsion system that is particularly well suited for geosynchronous spacecraft missions. In the past multiple propulsion systems or integrated bipropellant systems have been used to transfer a spacecraft to geosynchronous orbit and to maintain it in orbit.

Figure 1A:
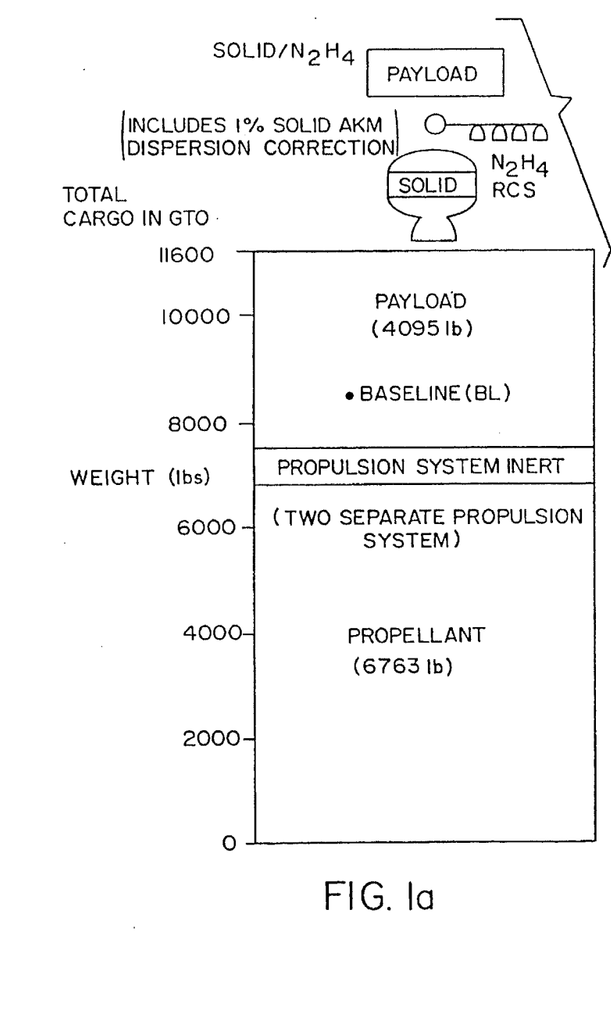
FIGS. 1a to 1c are a diagrammatic comparison of three propulsion systems, including (a) a solid propellant high-thrust motor and hydrazine catalytic thruster, (b) an integrated bipropellant system using monomethyl hydrazine fuel for both a high-thrust engine and reactive control systems thrusters, and (c) the dual mode propulsion system of one embodiment of this invention.
Figure 1B:
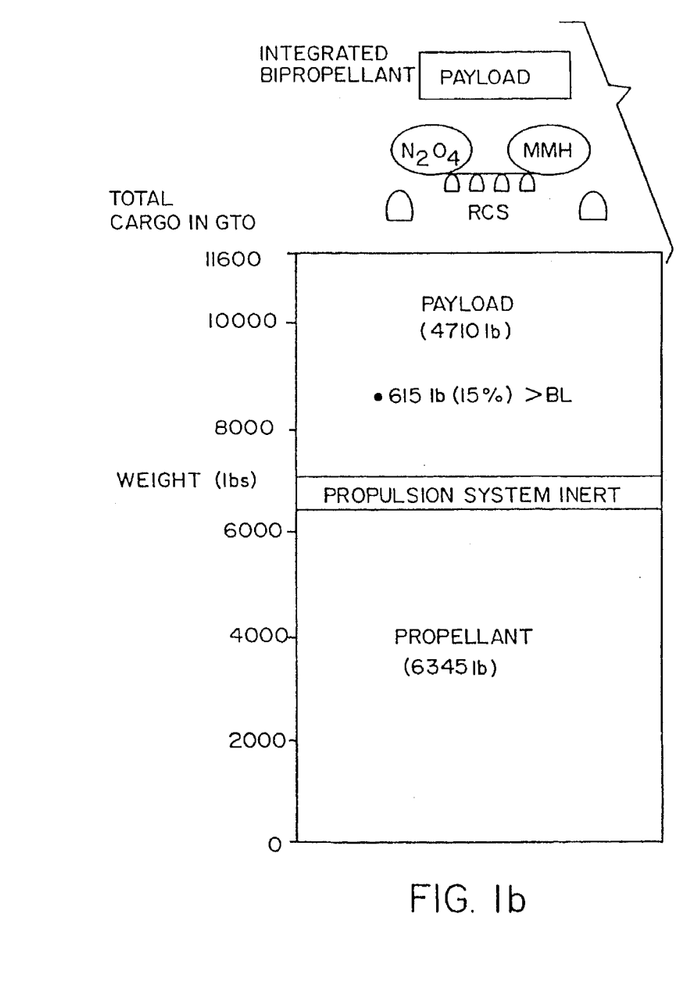
Figure 1C:
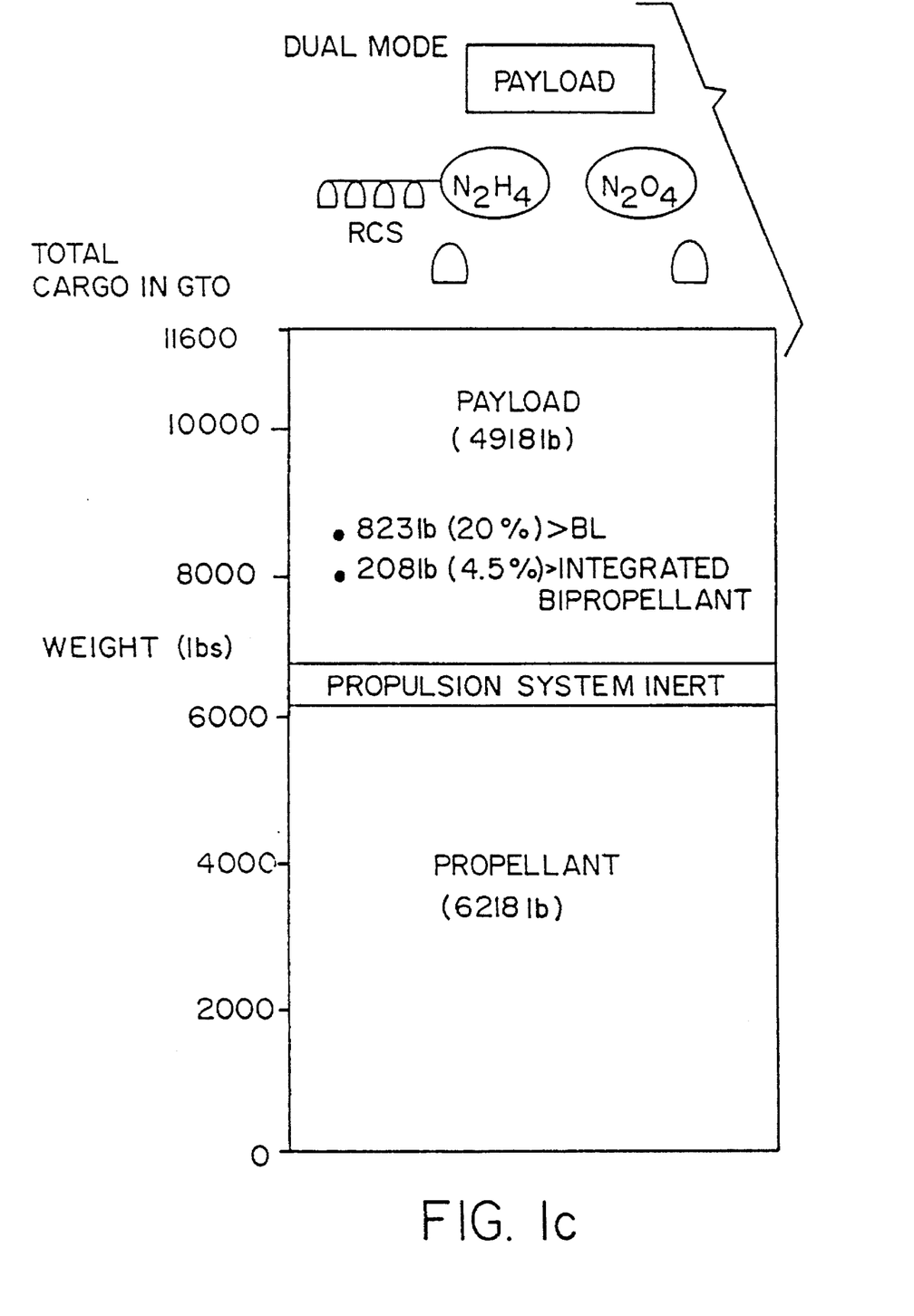

In accordance with one embodiment of the present invention, a dual-mode propulsion system employs the same fuel, pure hydrazine, in a bipropellant mode for injection into a geosynchronous orbit, and in the preferred embodiment of a cooled bipropellant thruster for station keeping and attitude control. FIG. 1 compares three types of propulsion systems, including one embodiment of the present invention, for a typical mission. The total cargo weight placed into a transfer orbit between a low earth orbit and a geosynchronous orbit, is assumed to be the same for all three cases, namely, 11,600 lbs. The mission includes the use of an apogee kick engine to effect a transfer to geosynchronous orbit, and an assumed life of 10 years for station keeping and attitude control activities.

In a conventional approach, shown on the left of the FIG. 1 and indicated at (a), a solid-fuel rocket is used for the transfer to geosynchronous orbit, and multiple hydrazine catalytic thrusters are used for station keeping and attitude control duties. The total propellant load is calculated at 6,763 lbs. The remaining component of total weight of the vehicle is the inert propulsion system weight, calculated at 742 lbs. The payload delivered to the orbit, exclusive of the remaining fuel and inert propulsion component, is 4,095 lbs.

In an integrated bipropellant propulsion system, illustrated in the center of the FIG. 1 and indicated at (b), the same fuel is used in all phases of the mission, namely monomethyl hydrazine (MMH) with nitrogen tetroxide (N$_2$O$_4$) as an oxidizer. The propellant requirements are reduced to 6,345 lbs. and the inert propulsion system component is reduced to 545 lbs., therefore, the payload is increased by about 15 percent, to 4,710 lbs.

In the propulsion system of one embodiment of the invention, illustrated on the right of the FIG. 1 and indicated at (C), pure hydrazine (N$_2$H$_4$) is used as the fuel for both phases of the mission, but is used in a bipropellant mode for the apogee "kick" phase, and is used in a monopropellant or bipropellant mode in the cooled bipropellant thruster for station keeping and attitude control. The total propellant weight is reduced to 6,218 lbs., and an inert component weight to 464 lbs. A payload is increased to 4,918 lbs., an increase of about 20 percent over the conventional propulsion systems on the left of the FIG. 1.

Figure 2:
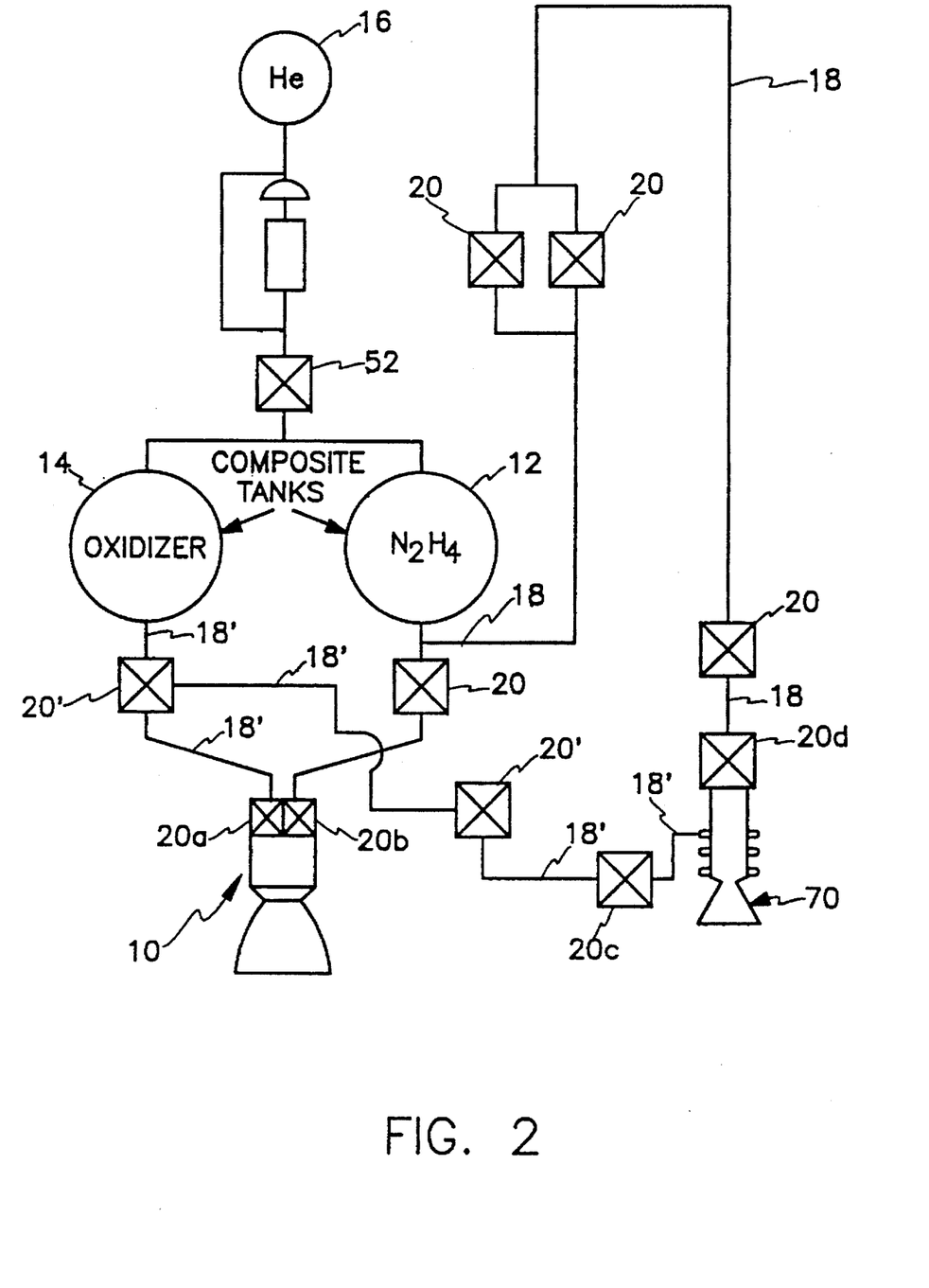
FIG. 2 is a schematic diagram of the dual mode propulsion system of the invention and includes a cooled bipropellant thruster.

FIG. 2 shows diagrammatically a typical propulsion system configuration in accordance with one embodiment of the present invention.

The configuration includes a liquid apogee engine 10 used for the apogee kick phase of a mission. It will be understood that there may be multiple apogee engines instead of the one shown. The apogee engine 10 is supplied with a fuel from the hydrazine tank 12 and with oxidizer from an oxidizer tank 14. The tanks 12 and 14 are pressurized conventionally using a pressurant supply tank 16, which contains a pressurized inert gas such as helium or nitrogen.

The hydrazine fuel tank 12 and the oxidizer tank 14 are connected by the appropriate supply lines 18 and 18' and the appropriate valves 20, 20', and 20a–d to thrusters 10 and 70.

The oxidizer used may be nitrogen tetroxide ($N_2O_4$) or other higher energy oxidizers, such as liquid oxygen, nitrogen trifluoride ($NF_3$), nitrogen tetrafluoride ($N_2F_4$), or combinations of these.

In accordance with the preferred embodiment of this invention, a cooled bipropellant thruster 70 may be used for station keeping and attitude control. FIGS. 6–11 show the cooled bipropellant thruster 70. The cooled bipropellant thruster has a standard $N_2H_4$ decomposition chamber 72. The TRW MRE-4 decomposition chamber is utilized in this preferred embodiment for the decomposition chamber 72. The hydrazine flows from the inlet line 18 through the cavitating venturi flow control valve 20d to react with a catalytic bed of decomposition material 74 such as, but not limited to, the iridium-alumina catalyst known as SHELL-405. The highly exothermic reaction between the catalytic bed of decompositions material 74 and the hydrazine produces a group of reaction gases which include ammonia, hydrogen, and nitrogen. This reaction takes place at a temperature of approximately 1700° F. The reaction gases are communicated by injectors 80 to the second reaction chamber defined by thruster housing 90. While it will be understood by one skilled in the art that several different configurations of injectors 80 may be used, the preferred embodiment uses four injectors 80 symmetrically spaced and each being approximately 0.100 inches in diameter. The injection of the reaction gases is shown schematically to take paces along the dashed line 84.

Figure 6:
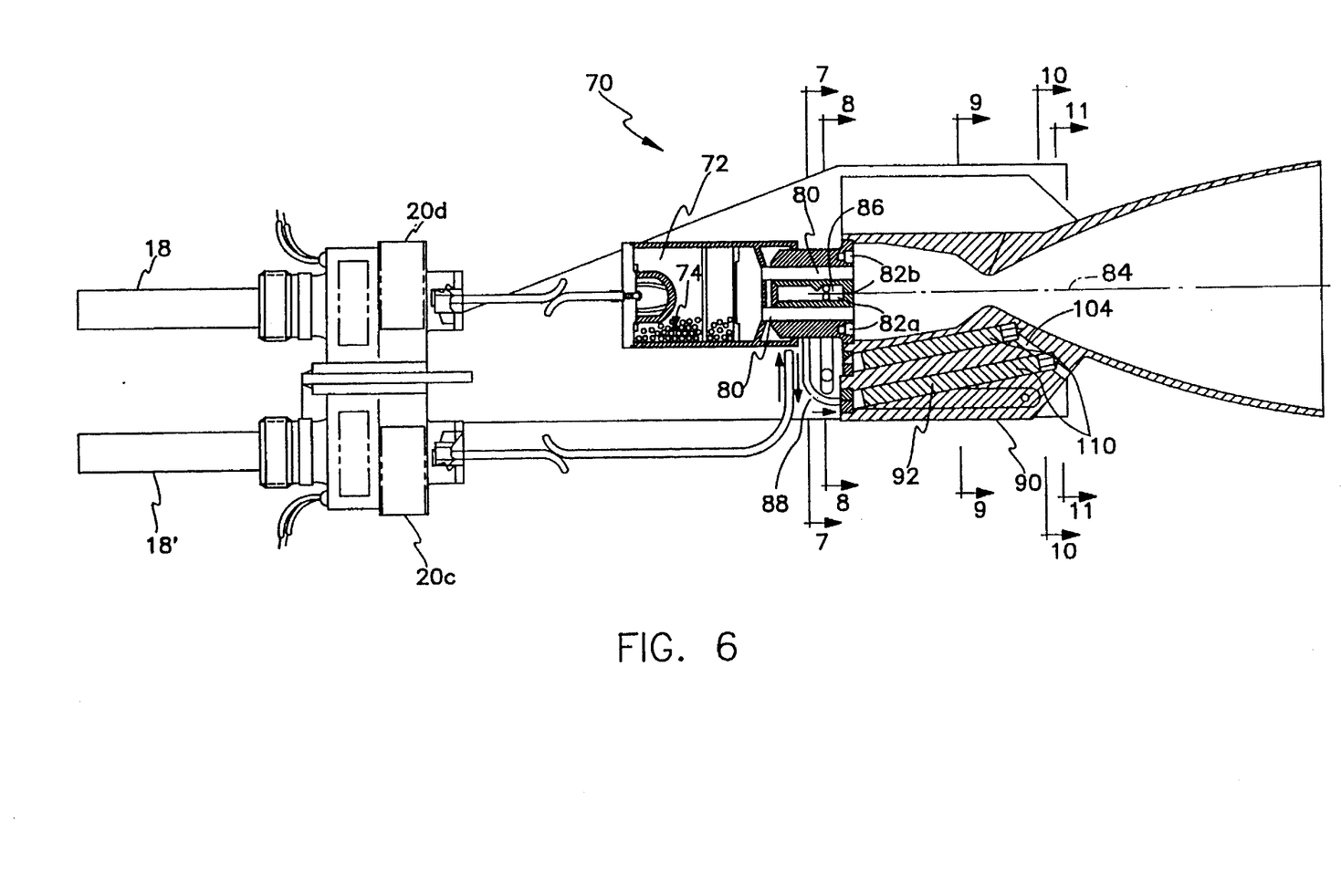
FIG. 6 is a cross-sectional view of the cooled bipropellant thruster in accordance with the preferred embodiment of the present invention.
Figure 7:
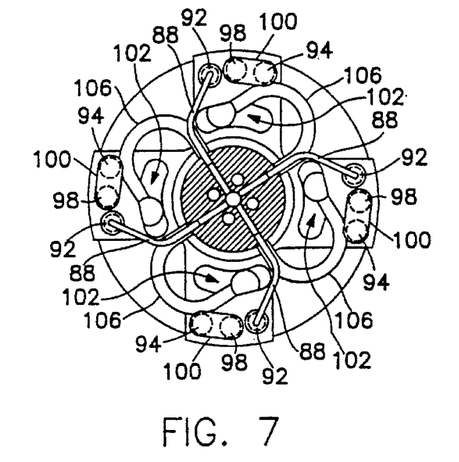
FIG. 7 is a cross-sectional view of the cooled bipropellant thruster illustrating the injection and cooling passages taken generally along the line 7—7 of FIG. 6.
Figure 8:
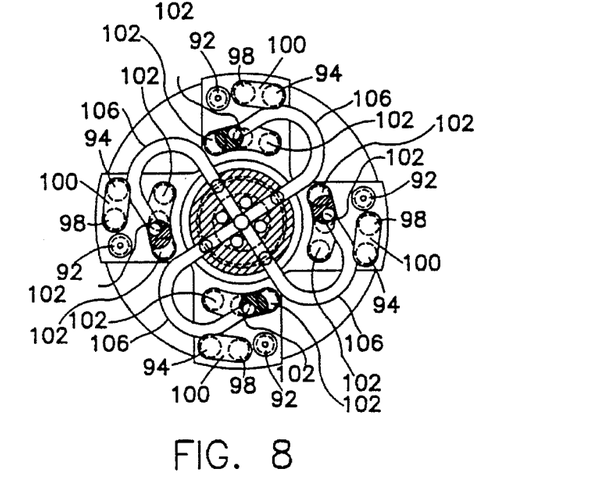
FIG. 8 is a cross-sectional view of the cooled bipropellant thruster taken generally along the line 8—8 of FIG. 6 and illustrating the injection and cooling passages.
Figure 9:
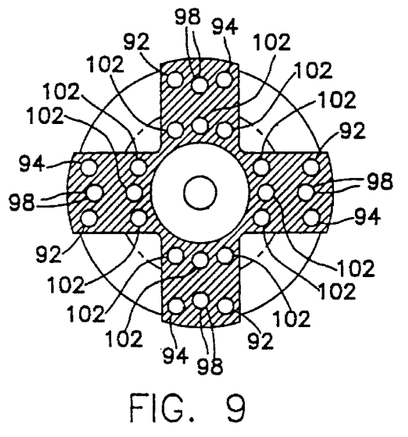
FIG. 9 is a cross-sectional view of the cooled bipropellant thruster taken generally along the line 9—9 of FIG. 6 and illustrating the cooling passages.
Figure 10:
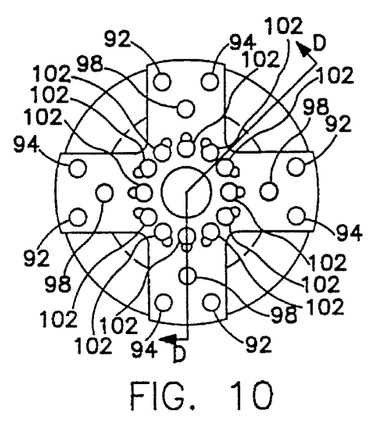
FIG. 10 is a cross-sectional view of the cooled bipropellant thruster taken generally along the line 10—10 of FIG. 6 and illustrating another view of the cooling passages.

The liquid oxidizer, which may consist of nitrogen tetroxide ($N_2O_4$) or liquid oxygen is communicated to the cooled bipropellant thruster 70 by the inlet line 18' and cavitating venturi flow control valve 20c. The oxidizer enters a central portion 86 of the thrust chamber 90. The central portion 86 distributes the oxidizer evenly to four cooling lines 88 which are shown in FIGS. 7 and 8. At the time the oxidizer reaches the thrust chamber 90, the reaction gases have heated the thrust chamber 90 to a point where it needs cooling. The cold liquid oxidizer performs the cooling function by flowing through the passages 92, 94, 98, and 102 within the thrust chamber 90 and by absorbing heat, which changes the liquid oxidizer to a heated gas phase. FIG. 6 taken in conjunction with FIG. 7 shows the cooling lines 88 communicating with the first cooling passage 92.

Figure 11:
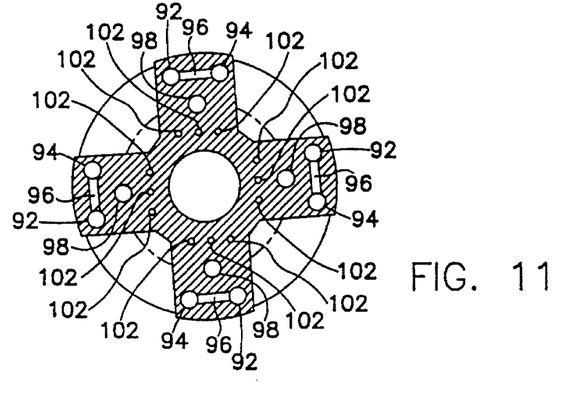
FIG. 11 is a cross-sectional view of the cooled bipropellant thruster taken generally along the line 11—11 of FIG. 6 and illustrating yet another view of the cooling passages.

Turning to FIG. 11, the first cooling passage 92 communicates with the second cooling passage 94 by a cross-over passage 96. At this point the liquid oxidizer should be receiving heat and a small fraction of the liquid should have vaporized or changed into a gas phase. The oxidizer flows along the second cooling passage 94 and receives additional heat. The third coolant passage 98 is shown in FIGS. 7 and 8 to be in communication with the second cooling passage 94 by the cross-over passage 100. The oxidizer flows through the third cooling passage 98 and is communicated to a series of three parallel running forth cooling passages 102 by cross-over passage 104 shown in FIG. 6. At the cross-over passage 104 the oxidizer should be 100 percent gas. The phase change of the oxidizer will have absorbed significant amount of heat and will have accomplished the majority of cooling the thruster housing 90. The heating and phase change accomplished in passages 92, 94, 98, and 102 is assisted by use of a flow swirler 110. One skilled in the art would understand that the flow swirler 110 is used to swirl the mixture liquid and gas in order to transfer more heat to the liquid and to help remove the gas from the passage walls.

The parallel running forth cooling passages 102 operate to superheat the oxidizer gas to approximately 250° to 300° F. The superheated oxidizer gas is communicated from the parallel running forth cooling passageways 102 by supply tubes 106. The supply tubes 106 communicate with oxidizer injectors 108. While designs may vary, the preferred embodiment uses a gas/gas triplet injector design in which oxidizing gas from two oxidizer injectors 108 impinge at an angle, shown schematically by dashed lines 82a and b, to mix with reaction gas flowing from a central reaction gas injector 80. The oxidizer injectors 108 are approximately 0.040 inches in diameter.

The reaction gas and oxidizer secondarily react to produce a strongly exothermic reaction at approximately 4,600° F. Due to the unique cooling feature in this preferred embodiment, the use of exotic materials or coatings for the thruster are not required. Potential materials for construction of thrust chamber 90 include, but are not limited to, common NICKEL 200 or 270, 6061-TG ALUMINUM and other aluminum alloys, copper based alloys, molybdenum, and COLUMBIUM. Another advantage of the cooling feature used in this preferred embodiment is that the oxidizer removes heat energy from the thrust chamber 90, returns that energy to the reaction and thereby forms an efficient adiabatic process. This helps increase the efficiency or $I_{sp}$ of the preferred embodiment.

Figure 3:
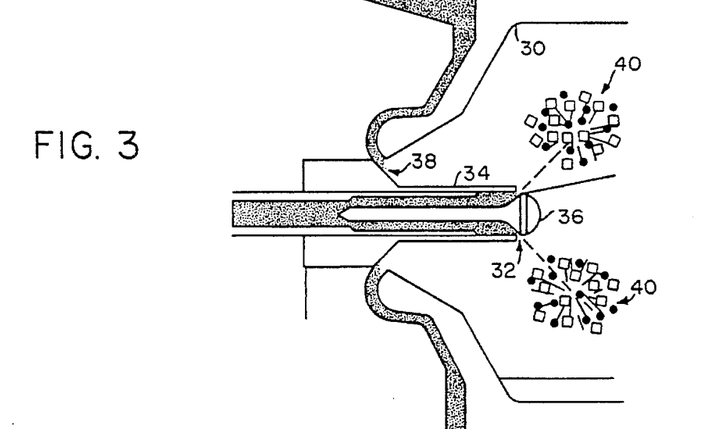
FIG. 3 is a diagrammatic cross-sectional view illustrating operation of a coaxial injector for use in the high-thrust engine that is part of the invention.

Turning back to the high-thrust engine 10, efficient operation of the engine 10 with pure hydrazine as a fuel depends very much on obtaining combustion and thermal stability. In one embodiment of the invention, combustion stability is obtained primarily with the use of a coaxial fuel injector of the same type disclosed in the U.S. Pat. Nos. 3,699,772 and 4,206,594, issued in the name of Elverum, Jr. FIG. 3 shows in diagrammatic form how the coaxial injector achieves smooth and continuous mixing with the fuel and oxidizer. Fuel is injected into a combustion chamber 30 through an annular orifice 32 between a sleeve 34 and a coaxial pintle 36 installed in the sleeve. Oxidizer is also injected through an annular orifice 38, between an outer portion of the sleeve 34 and a surrounding portion of the wall of the combustion chamber 30. The injected fuel and oxidizer diverge from their respective orifices in streams that intersect and mix together in a generally annular combustion region, indicated at 40. The resulting combination process is relatively smooth and stable, in spite of the use of extremely reactive pure hydrazine as a fuel.

Figure 4:
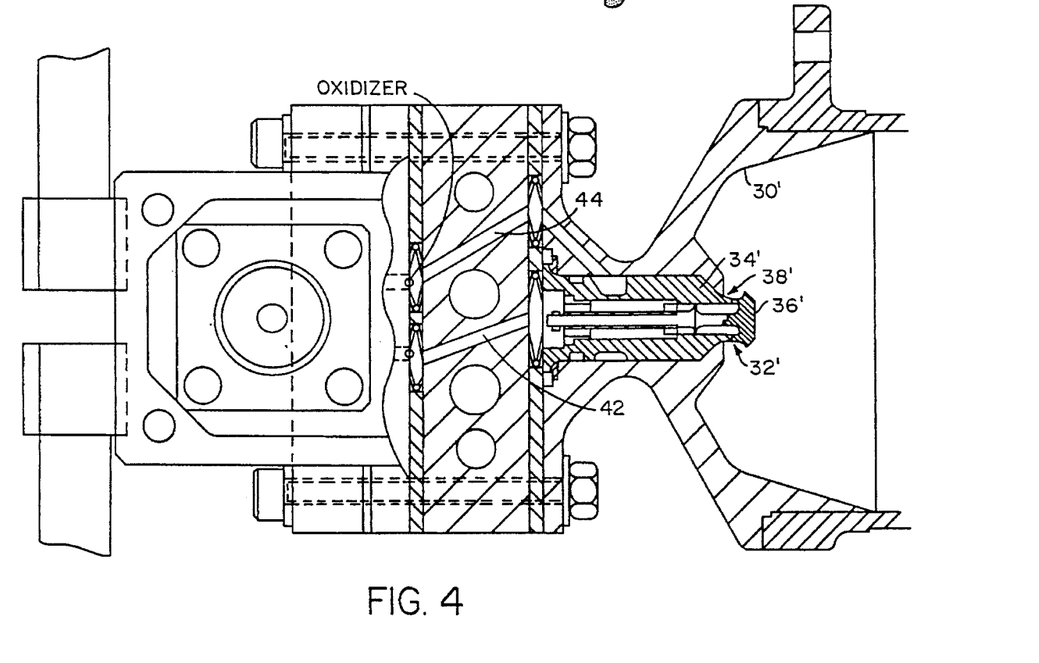
FIG. 4 is a fragmentary cross-sectional view of the coaxial injector used in the high-thrust engine that is part of the invention.
Figure 5:
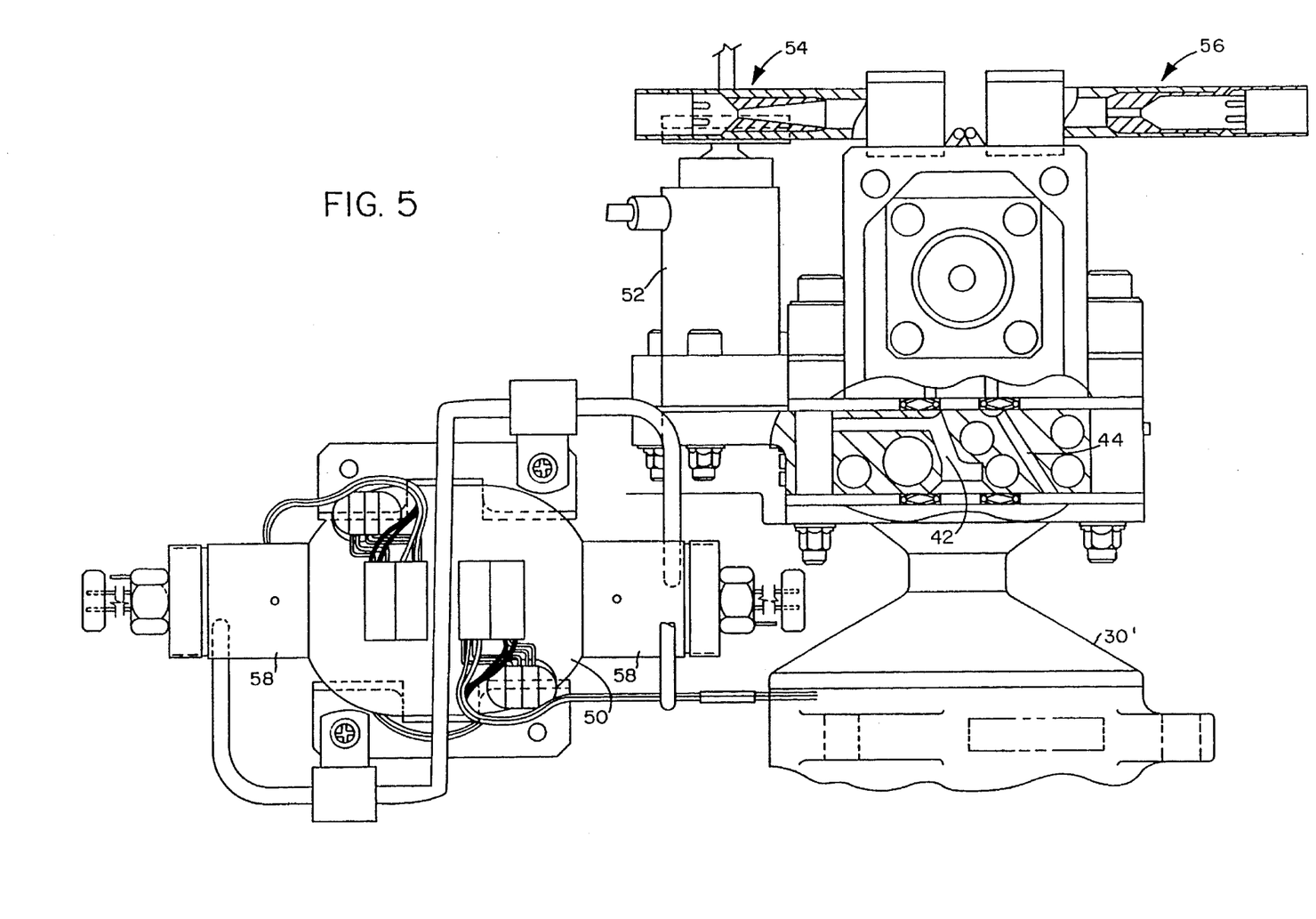
FIG. 5 is a view similar to FIG. 4, but showing in addition an inert nitrogen tank and purge control valve for purging the fuel line on shutdowns.

FIG. 4 is a more detailed cross-sectional view of a coaxial injector assembly of the engine 10, showing a portion of the combustion chamber 30', a pintle 36' and a pintle sleeve 34'. Fuel enters the assembly through a fuel passage 42 and is injected through an annular orifice 32'. Oxidizer enters through an oxidizer passage 44 and is injected through an annular orifice 38'. Depending on the details of the engine design, a significant difficulty may be encountered in shutdown of the high-thrust engine 10 operating on pure hydrazine fuel. Because the oxidizer, such as nitrogen tetroxide, has a higher vapor pressure than hydrazine fuel, the oxidizer has a tendency to back up into the fuel passage, where it mixes with the residual hydrazine and causes a violent overpressure on shutdown. The overpressure, which can be of almost explosive force, tends to deform the pintle 32 with respect to the surrounding sleeve 34. Carefully designed geometric relationships that define the fuel and oxidizer flow passages may be distorted as a result. One solution to this problem is to simply strengthen the components mechanically. This may be sufficient in some cases, especially where only one or two shutdowns are contemplated during the course of a single mission. However, for missions calling for a larger number of engine shutdowns another solution is needed. In one embodiment of this invention, fuel remaining in the fuel line downstream of the fuel shutoff valve is automatically purged into the combustion chamber 30' by an inert gas. More specifically, as shown in FIG. 5, the engine further includes an inert gas storage tank 16 and a purge control valve 52 to which the inert gas is connected. When the engine is shut down, by closing off the flow of fuel and oxidizer at valves 20b and 20a, respectively, the purge control valve 52 is momentarily open, and an inert gas, such as nitrogen, purges the liquid hydrazine from the fuel line downstream of the fuel valve 20b, flushing it into a combustion chamber 30' and thereby preventing unwanted combustion in the fuel line and potential damage to the pintle 36'. For reliability, the inert gas 50 is sealed during vehicle launch by two pyrovalves, which are later opened to allow the gas to flow as far as the purge control valve 52. The closed valve 58 prevents any unwanted interruption or contamination of fuel flow during the critical launch phase of the engine.

An alternative approach, which may be used with the high-thrust engine 10 and the cooled bipropellant thruster 70 is without using the inert gas to purge the fuel supply lines but, instead, to delay closing the fuel valves 20b and 20d for a preselected time after closing the oxidizer valves 20a and 20c. In the cooled bipropellant thruster 70, this method of operation should also include opening the fuel valve 20d for a preselected time prior to start-up, which in both cases prevents oxidizer from reaching the decomposition chamber 72. In essence, the fuel purges itself from the line, until all the oxidizer entering the combustion chamber has been reacted with the fuel. The specific time delay need is best established experimentally with specific engine design, but is typically less than one second. One skilled in the art would understand that above described method of opening and closing valves would amount to firing the thruster in a monopropellant mode for a specific time, then firing the thruster in a bipropellant mode and, finally, firing the thruster again in a monopropellant mode for another specific amount of time.

It will be appreciated from the foregoing that the present invention represents a significant advance in the field of spacecraft propulsion systems. In one embodiment, the invention provides a dual mode propulsion system that uses an identical fuel in two phases of the a mission; first as a fuel of a bipropellant engine for apogee kick or other high-energy phases of a mission and, thereafter, as a fuel for a cooled bipropellant thruster for station keeping and attitude control phases of a mission. Another advantage of the invention is that the high-thrust engine operates on pure hydrazine as a fuel without specific problems at shutdown. This is in part due to the use of an inert gas to purge the fuel line upon shutdown, or the alternative use of a delay in shutting off the fuel, to ensure that all oxidizer has been reacted in the combustion chamber.

In the preferred embodiment of this invention a cooled bipropellant thruster for station keeping and reaction control system (RCS) function is disclosed. This preferred embodiment utilizes liquid oxidizer and cooling passages. The efficient cooling of the bipropellant thruster provides a variety of advantages such as enabling the thrust chamber to be made of a wide variety of construction materials. In addition, the present invention accomplishes an efficient adiabatic process by removing energy from accumulating in an unwanted area and transferring it back to the reaction which imparts additional specific impulse performance to the cooled bipropellant thruster. It will also be appreciated that, although embodiments of this invention has been described in detail for purposes of illustration, various modifications may be made without departing from the spirit and scope of the invention. Accordingly, the invention is not limited except by the appended claims.

What is claimed is:

1. A thruster for a spacecraft comprising:

a thruster body having a first portion defining a first reaction chamber having therein a catalytic bed of decomposition material, said thruster body having a second portion defining a second reaction chamber, downstream of the first reaction chamber, for receiving reaction gases from the first reaction chamber;

means for feeding a liquid propellant to the first reaction chamber to react with the catalytic bed of decomposition material and produce reaction gases which flow from the first reaction chamber into the second reaction chamber, said reaction gases serving to heat the second portion of the thruster body defining the second reaction chamber;

at least one passageway formed in the second portion of the thruster body surrounding the second reaction chamber, said passageway having an inlet for receiving an oxidizer, with the liquid oxidizer flowing through the passageway and serving to cool the thruster body; and means for feeding the oxidizer from the outlet of the passageway into the second reaction chamber to react as a gas with the reaction gases flowing from the first chamber.

2. The thruster of claim 1 wherein the liquid propellant is hydrazine and the oxidizer is selected from the group of nitrogen tetroxide, liquid oxygen, nitrogen trifluoride, nitrogen tetrafluoride and combinations thereof.

3. The thruster of claim 2 in combination with an apogee engine, with both the apogee engine and the thruster being fed by the same propellant and oxidizer.

4. The thruster of claim 1 wherein the oxidizer is fed into the second portion of the thruster body as a liquid and flows in the passageway sufficiently to transform the oxidizer into a gas at a temperature of about 250°–300° F.

5. The thruster of claim 1 which further comprises:

flow swirler means in the passageway for swirling the oxidizer to promote heat transfer and removal of the oxidizer from the passageway.

6. The thruster of claim 1 which further comprises:

a plurality of elongated substantially parallel conduits in the second portion of the thruster body which are connected together at ends thereof to form a serpentine flow channel for the oxidizer which progresses radially inwardly from said inlet to said outlet; and injectors connected to said outlet for injecting the oxidizer into the second reaction chamber.

7. The thruster of claim 1 wherein the thruster body is made of a material selected from the group of nickel, aluminum, copper, molybdenum, columbium and alloys thereof.

8. A thruster for station keeping and attitude control of a spacecraft, said thruster comprising:

a source of liquid fuel consisting of essentially hydrazine;

a source of liquid oxidizer said oxidizer being selected from the group of nitrogen tetroxide, liquid oxygen, nitrogen trifluoride, nitrogen tetrafluoride or combinations thereof;

a thruster body including a first reaction chamber having therein a catalytic bed of decomposition material and a second reaction chamber downstream of the first reaction chamber;

means for feeding the liquid hydrazine from the source thereof to the first reaction chamber to react exothermically with the catalytic bed to produce a first group of reaction gases, the reaction gases flowing from the first reaction chamber into the second reaction chamber and heating the second reaction chamber;

at least one passageway formed in heat exchange relationship with said second chamber, said passageway having an inlet and an outlet, said inlet being coupled to receive the oxidizer while in a liquid state from the oxidizer source with the liquid oxidizer flowing through a first portion of the passageway to receive sufficient heat from the second reaction chamber to partially transform the liquid oxidizer to a gas phase, said oxidizer continuing to flow through other passageway portions to receive sufficient heat from the second reaction chamber to substantially completely transform the oxidizer to its gas phase, the phase change of the oxidizer from liquid to gas serving to cool the thruster body during maneuvers of the spacecraft; and means for feeding the gaseous oxidizer from the outlet of the passageway into the second reaction chamber to react with the gases flowing from the first reaction chamber to provide sufficient energy to perform station keeping and attitude control of the spacecraft.

9. A thruster for station keeping and attitude control of a spacecraft which also has an apogee engine which is used for the apogee kick phase of a mission, said thruster comprising:

a first tank of essentially pure hydrazine which is in a liquid state;

a second tank containing an oxidizer which is in a liquid state, said oxidizer being selected from the group of nitrogen tetroxide, liquid oxygen, nitrogen trifluoride, nitrogen tetrafluoride or combinations thereof;

said hydrazine tank and oxidizer tank supplying fuel to the apogee engine during the apogee kick phase of the mission of the spacecraft;

said station keeping and attitude control thruster being fed by the same hydrazine and oxidizer tanks during station keeping and attitude control phases of the mission of the spacecraft, said thruster including:

a first body defining a first reaction chamber having therein a catalytic bed of decomposition material;

a second body having an inner surface in the form of two cones having apexes that overlap to define a second reaction chamber;

means for feeding the liquid hydrazine from the tank thereof to the first reaction chamber to react exothermically with the catalytic bed of decomposition material and produce a first group of reaction gases, the reaction gases flowing from the first reaction chamber into the second reaction chamber and heating the second body;

at least one passageway formed in the second body, said passageway having an inlet and an outlet, said inlet being coupled to receive the oxidizer while in a liquid state from the oxidizer tank, with the liquid oxidizer flowing through the passageway and removing heat from the second body while simultaneously transforming the oxidizer into a gaseous state before the oxidizer reaches the outlet; and means for feeding the gaseous oxidizer from the outlet of the passageway into the second reaction chamber to react with the reaction gases flowing from the first chamber.

10. The thruster of claim 9 wherein the liquid oxidizer flows in the passageway sufficiently to transform the oxidizer into a gas at a temperature of about 250°–300° F.

11. The thruster of claim 9 which further comprises:

flow swirler means in the passageways for swirling the oxidizer to promote heat transfer and removal of the oxidizer from the passageway.

12. The truster of claim 9 which further comprises:

a plurality of elongated substantially parallel conduits in the second body and connected together at ends thereof to form a serpentine flow channel for the oxidizer which progresses radially inwardly from said inlet to said outlet; and injectors connected to said outlet for injecting the oxidizer gas into the second reaction chamber.

13. The thruster of claim 9 wherein the injectors serve to inject the oxidizer gas at converging radially inward angles into the second reaction chamber.

* * * * *